United States Patent

[11] 3,613,852

| [72] | Inventor | John G. Schwarzbeck<br>Downey, Calif. |
|---|---|---|
| [21] | Appl. No. | 845,174 |
| [22] | Filed | July 28, 1969 |
| [45] | Patented | Oct. 19, 1971 |
| [73] | Assignee | Western Gear Corporation<br>Lynwood, Calif. |

[54] RELEASABLE MOUNTING FOR POWER WHEEL
5 Claims, 6 Drawing Figs.

[52] U.S. Cl. .................................................. 198/127 R
[51] Int. Cl. .................................................. B65g 13/02
[50] Field of Search ........................................ 198/127,
105; 214/84

[56] References Cited
UNITED STATES PATENTS

| 3,279,585 | 10/1966 | Shen ................................ | 198/127 |
| 3,447,665 | 6/1969 | Egeland et al. ................ | 198/127 |

Primary Examiner—Evon C. Blunk
Assistant Examiner—Alfred N. Goodman
Attorney—Huebner & Worrel ABSTRACT: Releasable mounting for a power wheel in a conveyor system which features a cargo-moving assembly wherein the wheel is normally sustained in elevated position to make traction engagement with the bottom of the cargo, and in case of power failure or other emergency the mounting can be quickly and remotely actuated to drop the wheel out of contact with the cargo.

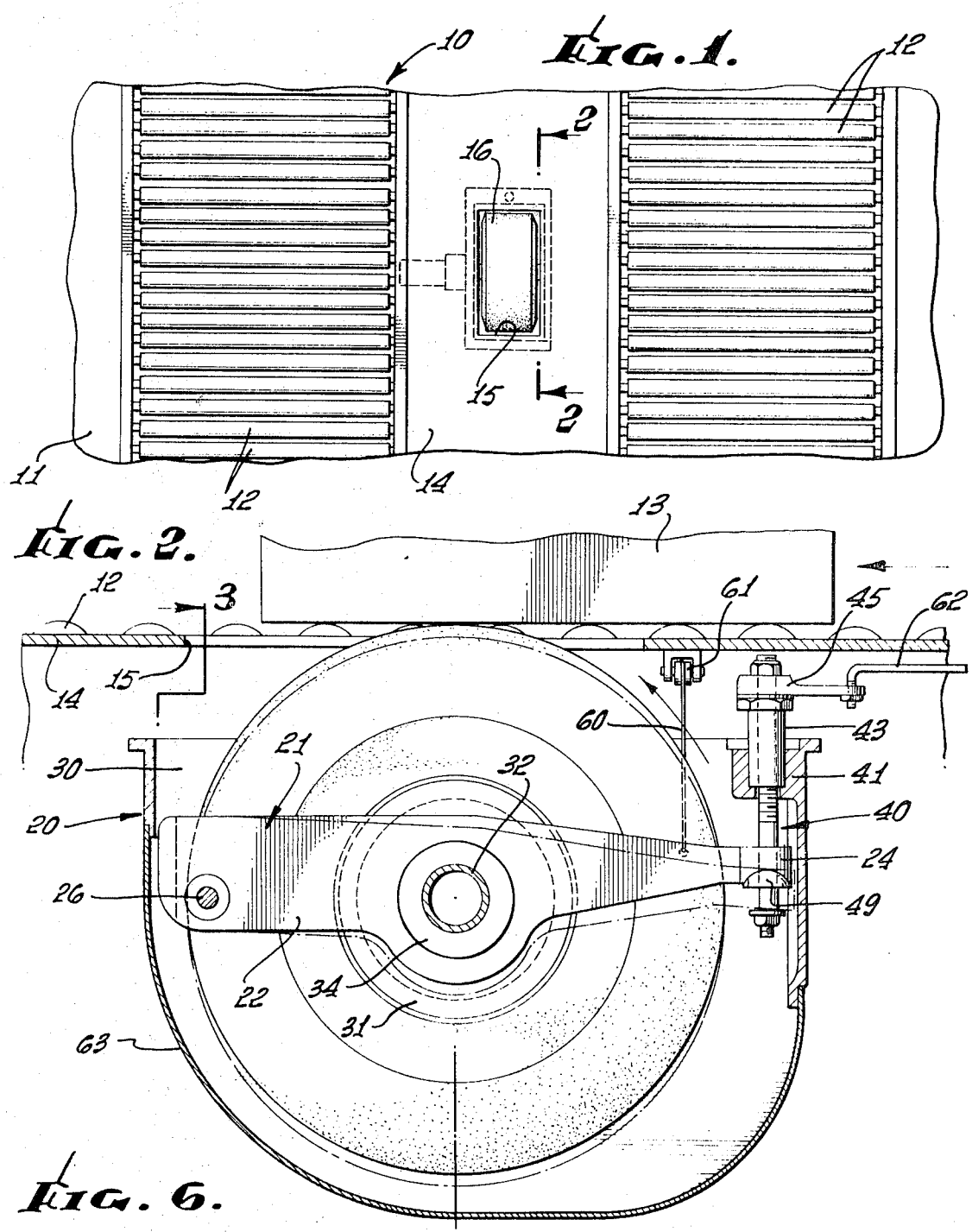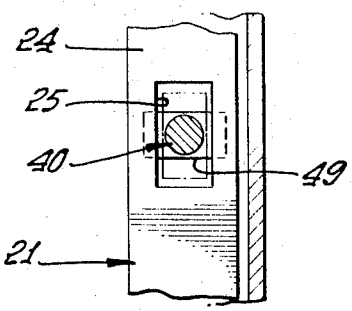

INVENTOR.
JOHN G. SCHWARZBECK
BY Huebner & Worrel
ATTORNEYS.

RELEASABLE MOUNTING FOR POWER WHEEL

BACKGROUND OF THE INVENTION

In shifting cargo containers or other movable objects for loading or unloading airplanes or other means of transportation or in warehouses, a conveyor system is sometimes employed which includes support means in the form of rollers, casters, balls or airlifts which will enable convenient shifting of the load, or storage thereof. Power-driven wheels, either pneumatic or solid-tired may be rotated in traction engagement with the load to propel it in the direction desired. In the event of a power failure or other emergency, the wheel should be retracted from its propelling engagement with the load so that the latter may be moved manually or by external mechanical means. Also, if the load is to remain at a given position, it is usually desirable to retract the wheel.

SUMMARY OF THE INVENTION

The present invention has for its primary object the embodiment of a simple and inexpensive mounting for such a wheel which is adapted to maintain the wheel in its load-propelling position, and to afford means for quickly lowering the wheel, preferably operable from a remote point, when conditions require.

To this end I provide a fixed-frame structure or support upon which is carried a wheel frame, the latter having suitable journaling means mounting the wheel. The wheel frame is pivotally mounted at one end on the fixed frame and is releasably retained at the other end. The elements forming the releasable retention means comprise a T-bolt of novel construction rotatably mounted on the fixed frame. The head of the T-bolt when in one rotational setting holds the associated end of the wheel frame in its upper, traction position. If the T-bolt is rotated 90°, the head of the bolt registers with a slot in the wheel frame, and the latter with the wheel drops by gravity to an inoperative position.

BRIEF DESCRIPTION OF THE DRAWINGS

In the drawings:

FIG. 1 is a fragmentary top plan view of a conveyor system in which the power wheel is installed.

FIG. 2 is an enlarged vertical section taken on the line 2—2 of FIG. 1.

FIG. 6 is a fragmentary horizontal section taken on the line 6—6 of FIG. 4.

DESCRIPTION OF THE PREFERRED EMBODIMENT

Figure 3:
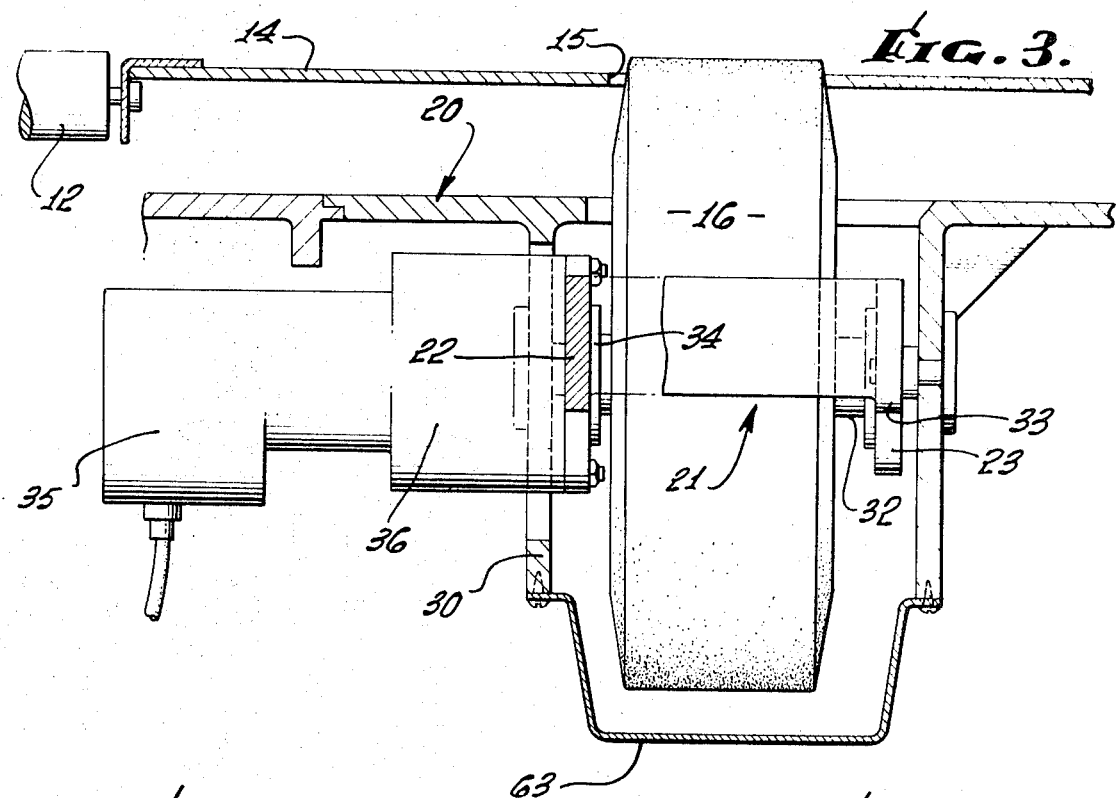
FIG. 3 is an enlarged vertical section taken on the line 3—3 of FIG. 2.
Figures 4, 5:
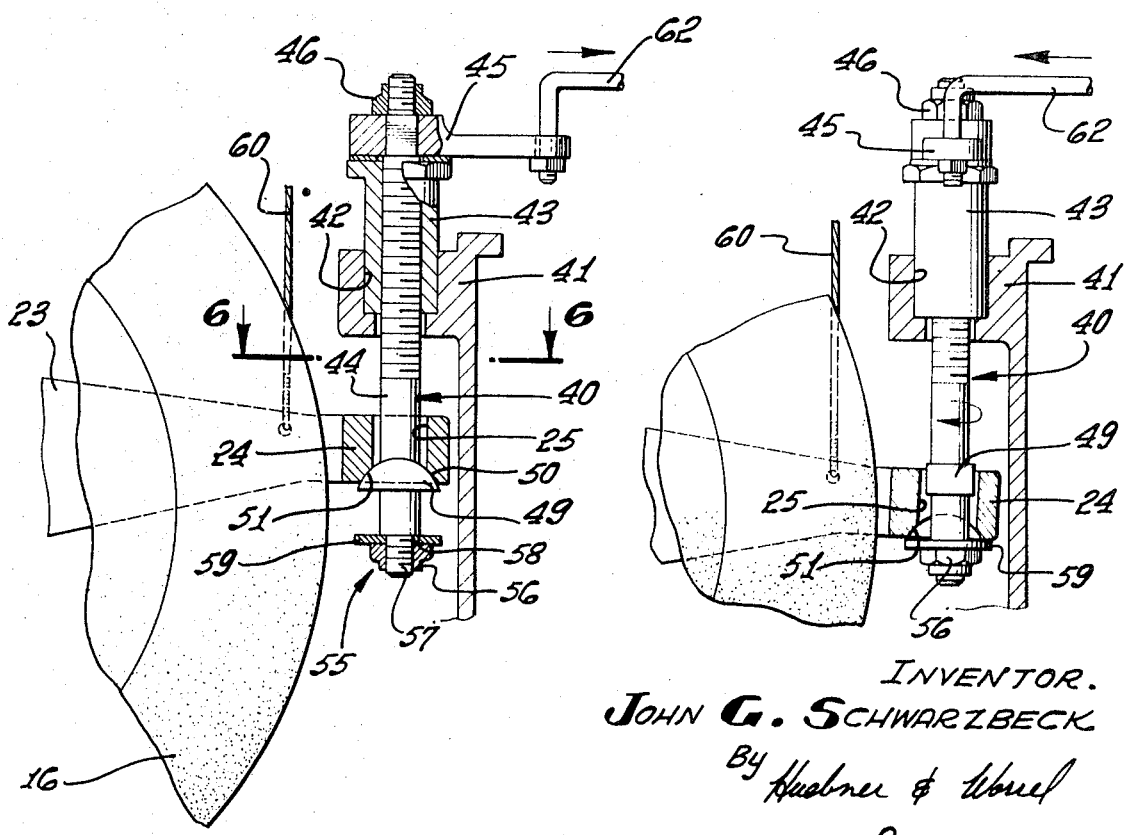
FIG. 4 is a further enlarged fragmentary section taken from the upper right-hand portion of FIG. 2.
FIG. 5 is a view similar to FIG. 4 with the wheel frame dropped to wheel in operative position.

A conveyor system 10, shown by way of example only, comprises a platform 11 incorporating rollers 12 which will movably support a load, shown by way of example as a cargo container 13.

The platform illustrated embodies a central section 14 with an opening 15 through which a power wheel 16 may extend for traction engagement with the bottom of the cargo container.

Located in proximity to the platform is a fixed frame 20 which may be permanently supported on any suitable base or suspending structure not shown. This frame is the primary mounting for a wheel frame 21. The latter is in the form of a yoke with legs 22 and 23 straddling the wheel 16. The yoke includes a crossarm 24 at one end which is formed with a slot 25.

The wheel frame is pivotally supported at the end opposite the slot by pivot pins 26 mounted in walls 30 of the fixed frame.

The wheel 16 may be constructed with a tread of rubber or any other suitable, preferably resilient, material.

In the example shown, it comprises a pneumatic tire mounted on a hub 31. A shaft 32 is formed integral with or may be keyed to, the hub. The shaft is journaled in bearings 33, 34 supported by the legs of the yoke.

Bolted to the wheel frame is a power source for rotating the wheel, shown here an an electric motor 35, with a reduction gearbox 36, having a conventional coupling with the wheel shaft. Upon actuating the motor the wheel is driven at greatly reduced speed.

The wheel frame is releasaby supported at the crossarm end by means next described.

A T-bolt 40 of special design is supported in a boss 41 which is a part of the fixed frame 20.

This boss is formed with a socket 42 in which is seated an internally threaded bushing 43. The T-bolt includes a shank section 44, the upper end of which is threaded and is engaged by the internal threads of the bushing. A lever 45 is seated on the upper end of the bushing. The desired height of the T-bolt can be adjusted by threading it up or down in the bushing, and is then set by nut 46. Tightening of the nut also clamps the lever 45 in place. The purpose of the lever is to change the rotational attitude of the T-bolt through turning the bushing in the socket.

Near the lower end of the bolt shank is a T-head 49 rigid with the shank. This T-head is rectangular in plan, but preferably has an arcuate upper surface 50 extending lenghtwise of the rectangle.

In one rotational attitude the head 49, lying below the crossarm 24, nests in an arcuate recess 51 against the lower surface of the arm, bridging the slot 25 and supporting the wheel frame in its upper position as seen in FIG. 2. This position sustains the wheel with its tread yieldably disposed in a plane sufficiently high to contact the bottom of the load with propelling traction.

The shank of the T-bolt extends a short distance below the T-head, and terminates with a stop element 55. This may be in the form of a nut 56 threaded on a reduced end 57 of the shank, affording a shoulder 58. The nut may be provided with a flange 59, or a washer may be utilized, seating against the shoulder. The outside diameter of the flange is greater than the width of the slot.

When, for any reason, it is necessary or desirable for the wheel to be retracted from its driving position, the T-bolt is rotated 90°. This may be done by direct turning application to the lever 45, or remotely through a rod 62. Such rotation of the T-bolt aligns the T-head with the slot. The latter is sufficiently larger in plan than the T-head to permit the crossarm to drop by gravity past the T-head and come to rest on the stop element 55. THe action is rapid because of the combined weight of the wheel and its rotary power drive means, and that of the wheel frame.

When it is desired to again put the wheel in action, the crossarm end of the wheel frame is lifted into its upper position. This may be done by various means. One example is a cable 60 trained over a pulley 61.

Element 63 is a dust cover, optionally employed as an attachment to the fixed frame.

As an alternative, the T-head on the bolt could be in the form of a cam with a lobe which would bear against the lower face of the crossarm but of a dimension which would not clear the slot. In one rotational attitude of the bolt the cam would support the crossarm in its upper position, and in another attitude the arm would ride down the cam to a lower position.

What is claimed is:

1. A releasable mounting for a power wheel in a cargo-moving assembly wherein a cargo platform is provided with transfer support means and the wheel is adapted to make traction engagement with the bottom of the cargo, said mounting comprising a wheel frame for mounting the wheel, means pivotally supporting the wheel frame at one end in a predetermined elevational position, and means at the opposite end of the wheel frame to sustain the wheel in an upper cargo engaging position or to drop it to a lower nonengaging position, the wheel frame comprising a yoke with a crossarm at said opposite end, and the means to sustain the wheel or to drop it comprising a rotatable T-bolt, means supporting the T-bolt, the T-bolt including a T-head adapted to engage the crossarm to support the same when the T-bolt is in one rotational attitude, the arm having a slot therein generally aligned with the T-bolt, the T-head bridging the slot when in said one rotational attitude and registering with the slot for the crossarm to drop past the T-head when the latter is in a second rotational attitude.

2. A mounting as defined in claim 1 which includes means to adjust the elevation of the T-head when disposed in the supporting position.

3. A mounting as defined in claim 2 in which the means to adjust the elevation of the T-head comprises a fixed socket, a bushing threaded on the T-bolt and seating in the socket, and locking means securing the bolt and the bushing in a selected axial relationship.

4. A mounting a s defined in claim 1 in which the means pivotally supporting the wheel includes a fixed frame, and pivot pins mounted in the fixed frame pivotally support the one end of the wheel frame.

5. A mounting device as defined in claim 4 in which the means supporting the T-bolt is a socket provided in the fixed frame.